Feb. 20, 1962     H. R. BEESON     3,021,603
GAUGING DEVICE
Filed Oct. 3, 1957     5 Sheets-Sheet 4
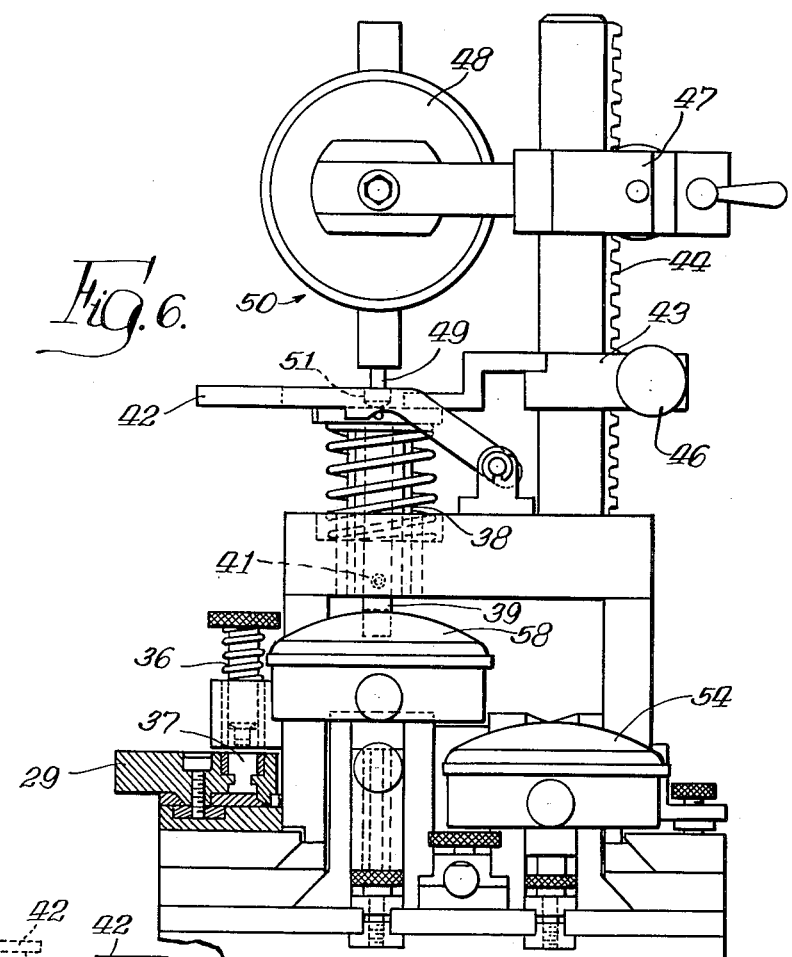
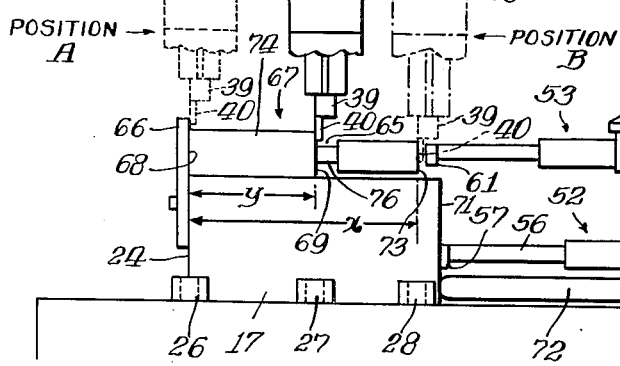
INVENTOR.
Harry R. Beeson,
BY Mueller & Aichele
Atty's.

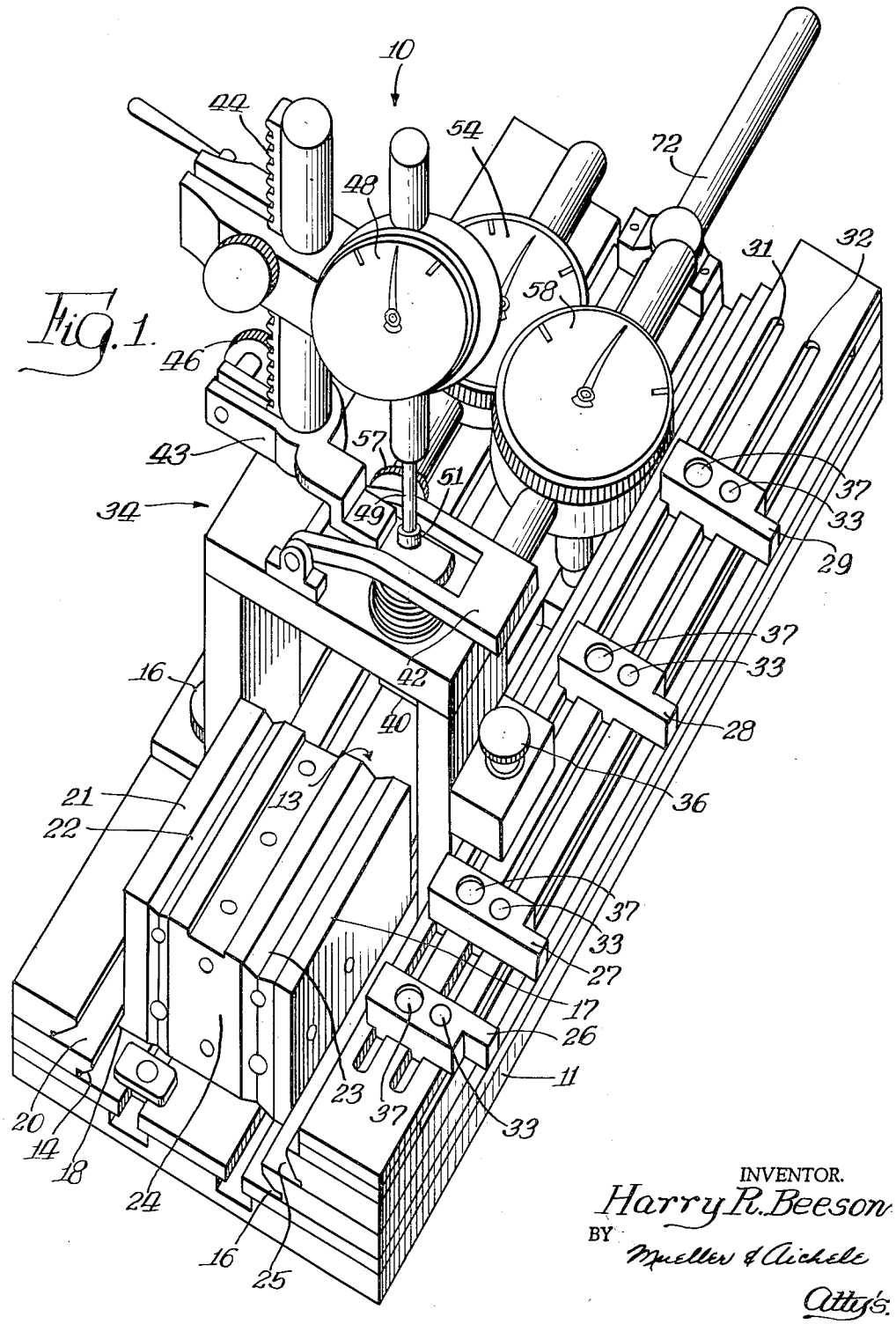

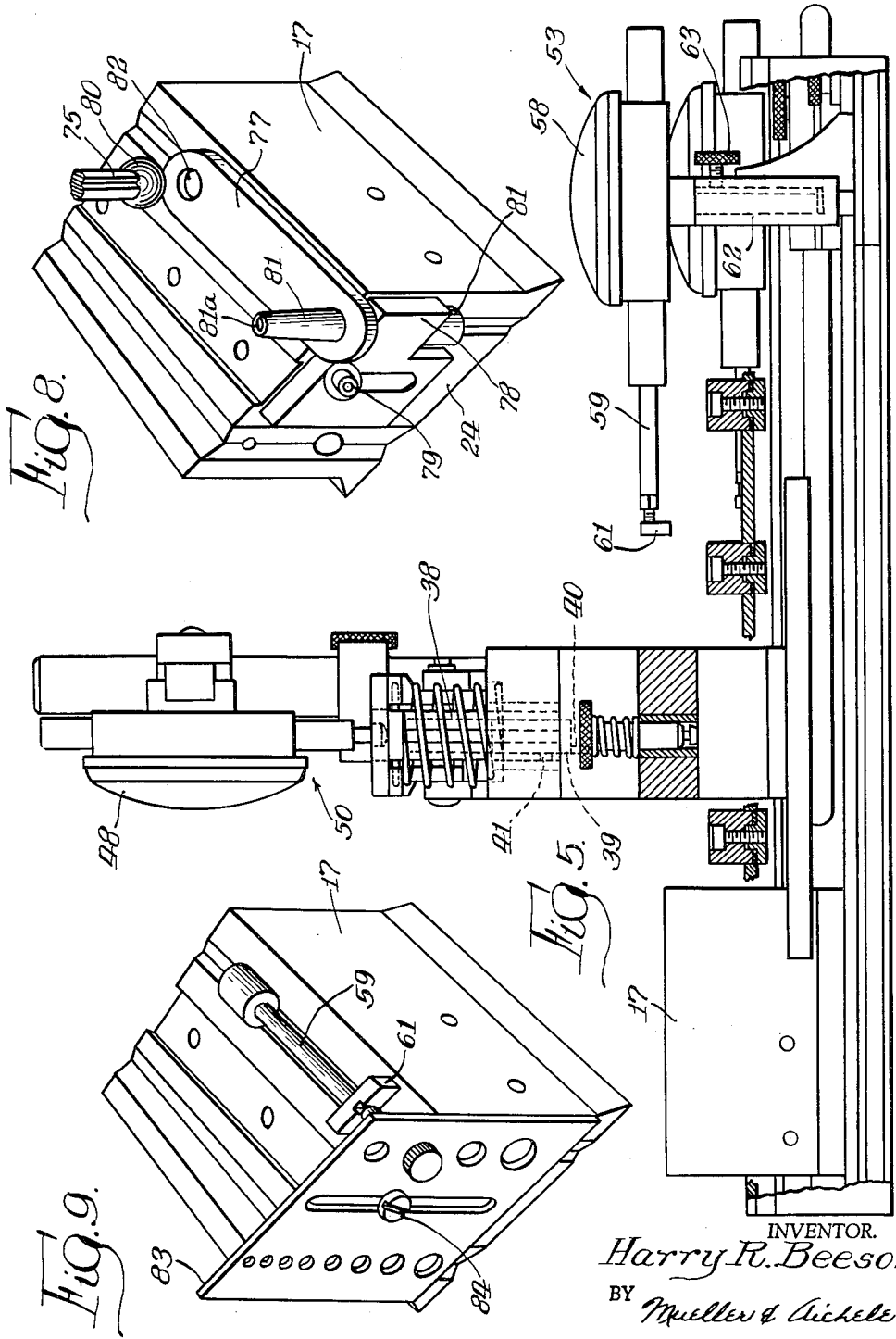

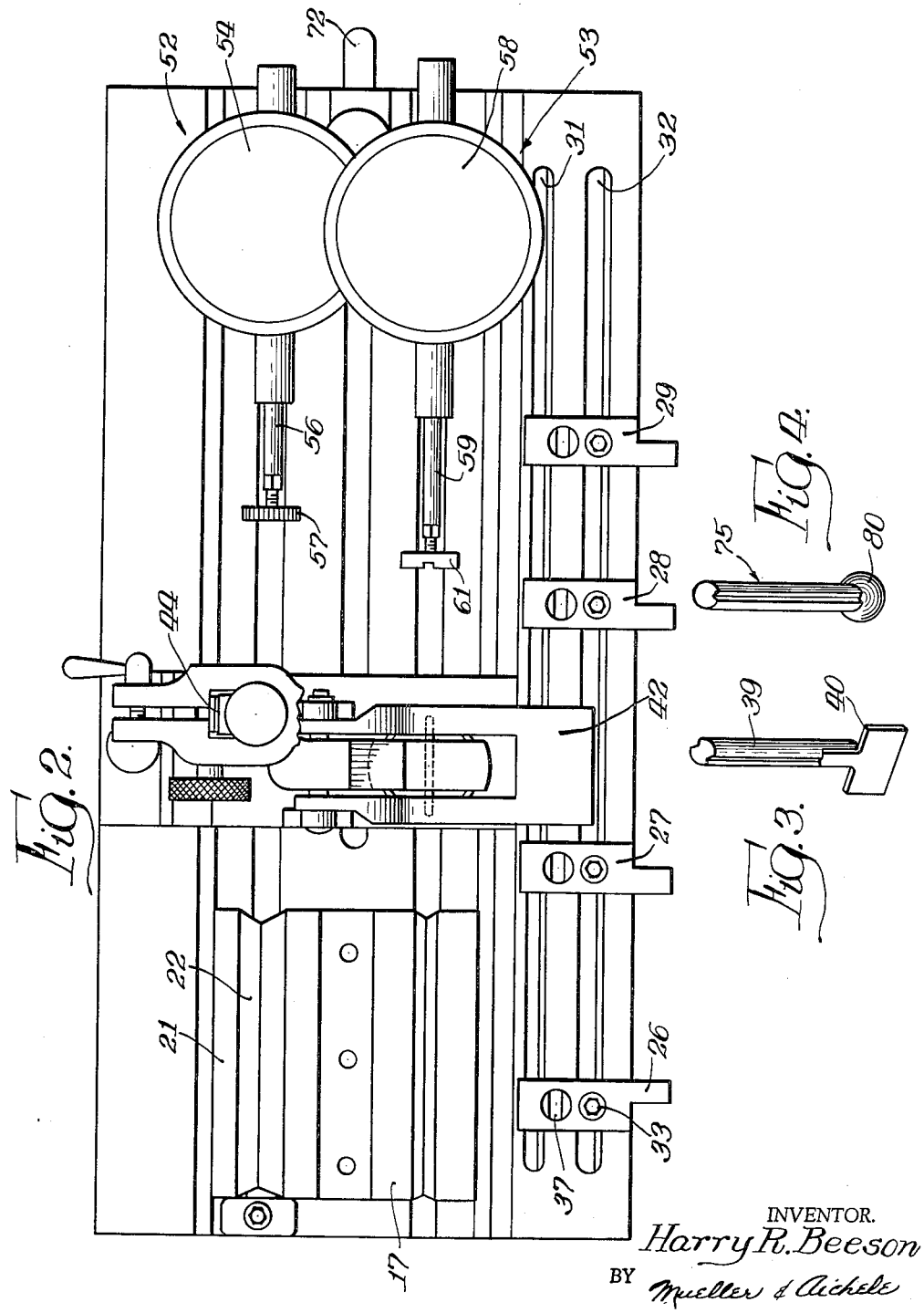

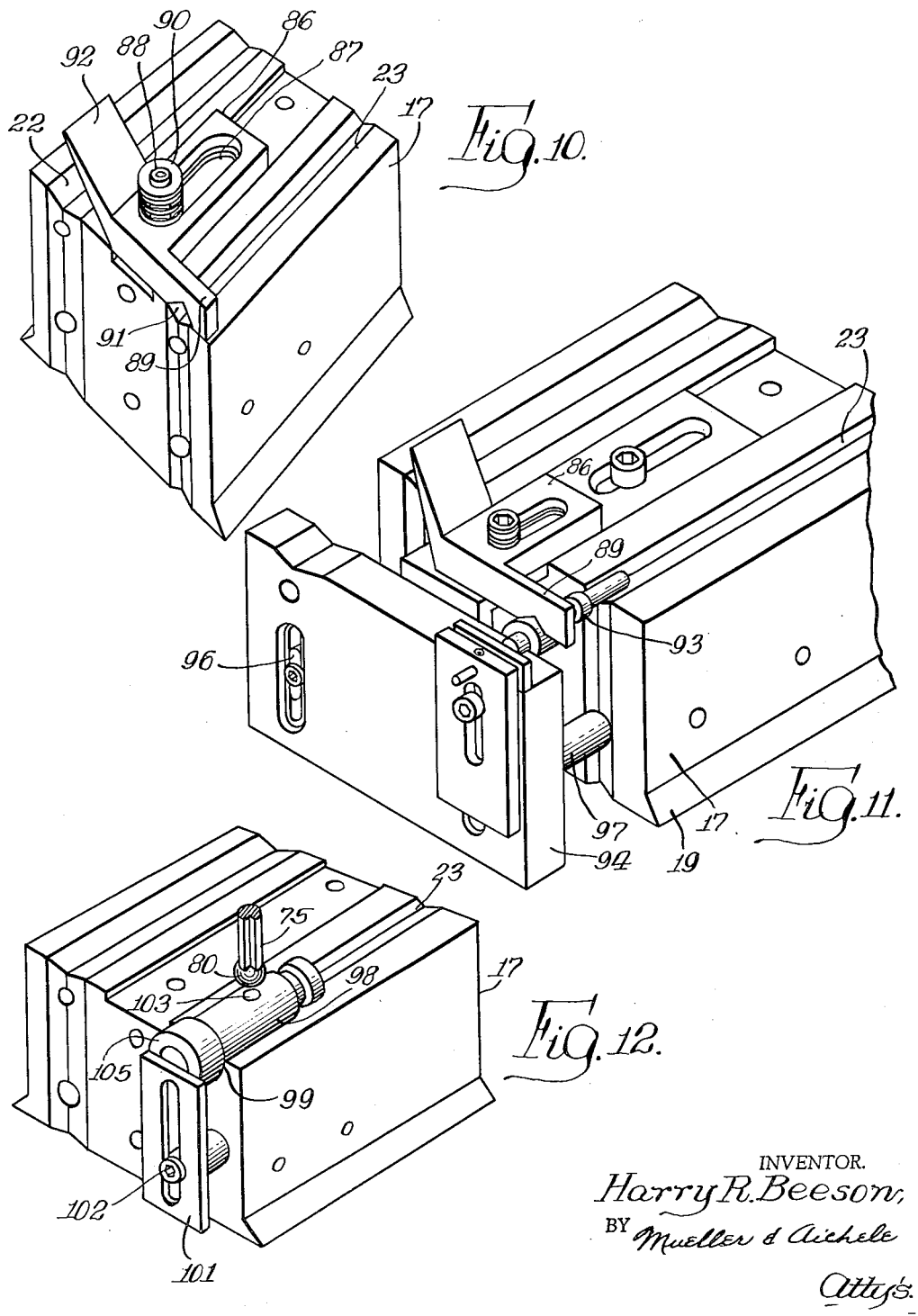

3,021,603
Patented Feb. 20, 1962

3,021,603
GAUGING DEVICE
Harry R. Beeson, 2134 N. 74th Ave., Elmwood Park, Ill.
Filed Oct. 3, 1957, Ser. No. 688,082
5 Claims. (Cl. 33—174)

This invention relates to gauging devices and more particularly to a device useful in gauging a number of dimensions of a variety of parts, particularly screw machine parts.

In manufacturing operations wherein a multiplicity of parts are made with each having several dimensions to be made within predetermined tolerances, it is desirable to provide for quick and easy determination of whether the dimensions of the parts meet the desired tolerances. This may be done, for example, by the use of a so-called optical comparator which involves the projection of an enlarged shadow of each work-piece onto an enlarged silhouette on which the tolerances of the various dimensions are represented. This method has the disadvantage of requiring great care in the preparation of the standard silhouette pattern and also requires rather expensive and complicated apparatus.

Another procedure that has been employed involves the use of fixed gauges especially prepared for use with one particular part having known dimensions and tolerances. In this way, a number of gauges can be arranged to simultaneously indicate several dimensions of a particular workpiece. Such devices, however, have the disadvantage of being applicable only to workpieces of the same size and shape and are not readily adaptable to the gauging of pieces of a different type unless they are completely dismantled and rebuilt.

An object of the invention, therefore, is to provide a relatively simple and inexpensive gauging device that can be used to determine the deviation of a plurality of different dimensions of a workpiece from predetermined dimensions and to indicate whether the dimensions are within desired tolerances.

Another object of the invention is to provide a compact gauging device that can be adapted for gauging the dimension of a variety of workpieces of different sizes and configurations by the incorporation of various simple attachments into the device and which, due to the flexibility of its application, can be used to make all the measurements made by a multiplicity of fixed gauges.

Another object of the invention is to provide a gauging device that can be used to gauge the lengths and diameters of different portions of screw machine products and also to determine the deviation of the position of apertures, shoulders, grooves, flats and the like from a predetermined position with respect to a particular part of a workpiece.

Another object of the invention is to provide a gauging device which can be set up to measure several different dimensions of a particular workpiece and which will indicate whether those dimensions are within the desired tolerances upon the making of a series of simple adjustments by the operator of the device.

A feature of the invention is the provision of a plurality of movable setting blocks capable of adjustment along a direction in which dimensions of a workpiece are to be measured, which blocks serve as reference points for determining variation of various dimensions of a workpiece from a predetermined standard. This feature enables the device to be set up for measuring several dimensions of a given workpiece. The blocks need be positioned only once for the gauging of a given set of dimensions. The blocks may be quickly and easily repositioned so that the same device can be used for the gauging of workpieces of a variety of sizes and shapes.

Another feature of the invention is the provision of a movable workholder on which a workpiece to be gauged is held and which can be adjusted by application of light manual pressure to move a portion of the workpiece against a fixed contact member while at the same time actuating a gauge by its movement so that the amount of movement by the holder to move the workpiece against the contact member indicates directly on the gauge the variation of a dimension of the workpiece from a given dimension. Since movement of the holder rather than the workpiece being gauged is indicated, workpieces of a variety of shapes can be gauged using the same device without repositioning of the gauge.

Still another feature of the invention is the provision of a movable support which can be fixed in a plurality of predetermined positions on a gauging device by attaching it to one of a number of setting blocks and which support is adapted for holding attachments against which different portions of a workpiece are moved to determine the variation in position of those portions from a predetermined position with relation to other portions of the product. Successive attachment of the bridge to the positioned setting blocks enables a number of longitudinal dimensions to be gauged in rapid succession by a series of sliding adjustments of the holder to which the workpiece is secured.

Another feature of the invention is a combination of a movable workholder cooperating with a pressure actuated gauge, a bridge assembly movable with the holder and adjustable setting blocks so that the holder and bridge can be moved through a predetermined distance as measured on the gauge and a setting block aligned with the bridge to serve as an accurately located reference point. In this way, the gauging device can be set up for use without reference to calipers, gauging blocks or the like and is a self-contained instrument.

In the drawings:

FIG. 1 is a perspective view of the gauging device of the present invention;

FIG. 2 is a top view of the gauging device with one of the indicator dials removed for clarity;

FIGS. 3 and 4 are perspective views of contact attachments used in conjunction with the device;

FIG. 5 is a side view partially in section of the gauging device;

FIG. 6 is an end view partially in section of the gauging device;

FIG. 7 is a simplified, schematic view illustrating the operation of the invention in gauging a screw machine part;

FIG. 8 is a perspective view of a portion of the gauging device illustrating its use to locate the position of an aperture;

FIG. 9 is a perspective view of the workholder of the gauging device showing its use in the gauging of rivets;

FIG. 10 is a perspective view of the workholder showing a clamping device employed in the affixing of certain types of screw machine parts to the workholder;

FIG. 11 is a perspective view showing at attachment useful in gauging screw machine parts having a number of different diameters; and FIG. 12 illustrates the location of a hole in a cylindrical workpiece by use of the gauging device of the invention.

In accordance with the invention, an improved gauging device includes a longitudinally slidable workholder adapted for supporting workpieces of a variety of shapes. Longitudinal movement of the holder to bring portions of a workpiece held thereon into registry with preset contact means is indicated directly on a gauge in contact with one end of the holder and actuated by its movement. This arrangement enables the device to be used for making a variety of measurements, such as the location of shoulder, apertures, grooves, flats and the like simply by employing appropriate contact means easily attached to the device. The contact means are held on a longitudinally slidable support which is adapted to be affixed successively to a number of setting blocks set in predetermined positions along the direction in which the holder slides.

In gauging a workpiece held on the upper surfaces of its holder, the front end of the holder is aligned with one of the setting blocks which serves as a master reference point. At the same time, the anvil of the gauge is brought into contact with the back end of the holder and its indicator set at zero. A second setting block is set a predetermined distance from the first corresponding to a longitudinal dimension of a workpiece to be gauged, such as the distance of a shoulder from one end of the piece. The slidable support carrying the contact means, such as a vertically aligned flat blade, is secured to the second setting block. The contact means is adjusted to a suitable vertical position and the longitudinal position of the holder adjusted to bring the shoulder of the workpiece held thereon into registry with the contact means. The end or other portion of the workpiece with respect to which the shoulder is to be located is aligned with the front end of the holder. Since the anvil of the gauge continues to engage the back end of the holder, the gauge will indicate directly the deviation in the distance between the shoulder and the end of the workpiece from the distance established between the setting blocks. By employing a multiplicity of setting blocks, a number of dimensions along a workpiece can be gauged in the same way by successively connecting the support for the contact means to the various blocks and sliding the holder to bring particular portions of the workpiece into registry with the contact means. Thus, after a single setting operation the device can be used for the gauging of several different dimensions of a particular workpiece and a large number of like pieces gauged in rapid succession. Simply by changing the positions of the setting blocks and in some instances, by attaching different contact means, the device can be quickly adjusted for the gauging of a series of workpieces of an entirely different type and size. Therefore, a single device can be used to make measurements that would require the use of a number of different fixed gauge arrangements.

In the accompanying drawings, a gauging device generally indicated at 10 includes a base member 11 which as illustrated in FIG. 1 is formed of a number of horizontal metal plates so arranged as to form a central channel 13 along whose sides are formed a pair of tracks 14 and 16. A workholder 17 of generally block-like shape is provided with longitudinally extending lip portions 18 and 19 which fit in the tracks 14 and 16 respectively.

In the embodiment of the invention particularly illustrated the top surface 21 of the holder 17 provides a pair of longitudinal V-grooves 22 and 23 which serve to accommodate cylindrical screw machine workpieces to be gauged. The top surface 21 and the front end surface 24 of the holder are provided with a number of openings to permit the affixation of various clamps and other attachments used in securing workpieces to the holder.

A multiplicity of setting blocks 26, 27, 28 and 29 are slidably positioned in longitudinal grooves 31 and 32 extending along one edge of the device. Each of setting blocks is provided with a screw 33 for locking it into the desired position.

A bridge assembly generally indicated at 34 which is slidable along a pair of tracks 20 and 25 above and parallel to the direction of motion of the holder 17. The bridge assembly 34 is adapted to be affixed to any of the setting blocks by means of the locking pin 36 which is adapted to be locked into one of the openings 37 formed in each of the setting blocks.

The bridge assembly 34 includes a plunger 38 into which a contact attachment 39 is secured by a set screw 41 as best shown in FIGS. 5 and 6. A plunger lever 42 is adapted to depress the plunger and vertically move the contact attachment such as 39 into the desired position during operation of the gauging device. A plunger stop 43 is adapted to be affixed to the vertical rack 44 by the knob 46 for adjusting the plunger in the desired vertical position.

The horizontal arm 47 is also adjustably mounted on the rack 44 and supports gauge 50 which includes dial indicator 48. The dial indicator 48 is actuated by vertical movement of the stem 49 which has an anvil member 51 attached to its lower end.

As best shown in FIG. 2, the gauging device 10 also includes the horizontally disposed gauges 52 and 53. The gauge 52 made up of dial indicator 54, which is actuated by the movement of the stem 56 which carries anvil 57 at its end. Both gauges 52 and 53 are longitudinally slidable along the base 11 and the gauge 53 is also adjustable vertically being adjustably mounted on vertical support 62 by the screw 63 as best shown in FIG. 5.

FIG. 7 illustrates in a schematic and simplified form the use of the gauging device in connection with a typical screw machine product. The workholder 17 is moved to a position near the front of the device such as shown in FIG. 1 with a suitable vertical plate attachment 66 secured to its front end 24. The attachment 66 is subsequently used for the positioning of the workpiece to be gauged on the holder 17 but a workpiece is not placed on the holder until the device has been set up. The setting block 26 is then moved adjacent the front end 24 of workholder 17 and locked into place. The bridge assembly 34 is slid forward and locked to the setting block 26. The plunger lever 42 is then depressed to lower the contact attachment 39 and the flat blade 40 into the position shown in dotted lines and indicated as position "A" of FIG. 7. The holder 17 is then adjusted horizontally so that the vertical edge of attachment 66 engages the vertical edge of blade 40 as shown in position "A." Gauge 52 is moved so its anvil 57 contacts the rear surface 71 of the holder 17. Dial indicator 54 is set at zero and the gauge itself is locked into position. Stem 56 is resiliently mounted so that anvil 57 remains in contact with holder 17 as it moves to the left or right in FIG. 7. The setting block 28 is locked into position with its center spaced from the center of setting block 26 at a distance equal to the longest dimensions to be gauged for the particular workpiece to be measured. The bridge assembly 34 is then unlocked from setting block 26 and slid back into alignment with setting block 28 to which it is then locked. The plunger lever 42 is again depressed and the contact blade 40 lowered to the position indicated by the dotted lines as position "B" on FIG. 7. Gauge 53 is then moved so that its anvil 61 comes into contact with the flat edge of contact blade 40 as indicated. The dial indicator 58 of the gauge 53 is set at zero in this position and the gauge is locked in place.

The holder 17 is then pressed against the anvil 57 until the dial 54 reads an amount past zero equal to the thickness of the contact blade 40. With the holder in this position the stop rod 72 is moved into contact with the back surface 71 of the holder 17 and locked into place.

The setting block 27 is then locked into position a predetermined distance from setting block 26 equal to the next longest dimension to be measured. This distance may be determined by the use of gauging blocks, calipers, or any other convenient manner. Setting block 28 could be used for this purpose since it can be moved once gauge 53 is locked in place.

The gauging device is now set up for the measurement of two longitudinal dimensions of a screw machine part. After the setting up operation, a screw machine part 67 is placed in the top of the holder 17 with one shoulder 68 against the vertical surface of attachment 66. Suitable clamping means prevent relative movement between the part and the holder. The gauging device is set up to gauge the dimension "X" between the shoulder 68 and the end surface 73 and the shorter dimension "Y" between the shoulder 68 and the shoulder 69.

The bridge assembly 34 is aligned with the setting block 27 and secured to it. The plunger lever 42 is pressed to lower the contact blade 40 to the position shown in solid lines in FIG. 7. By means of light pressure applied by the operator, the workholder 17 is adjusted so that the shoulder 69 engages the blade 40 as shown in FIG. 7. The movement of the workholder 17 against anvil 57 which rests against surface 71 actuates the stem 56 of gauge 52 and this movement is indicated on dial indicator 54. If the dimension "Y" between shoulders 68 and 69 is exactly the same as the distance set between setting blocks 26 and 27, then the indicator 54 will read zero. However, if the position of the holder 17 is different from that it occupied when the device was set up, this difference will be registered directly on the indicator 54.

The width of recess 65 on workpiece 67 is determined by moving the holder 17 away from contact blade 40 until its opposite vertical side rests against opposite vertical side of recess 65. The movement of holder 17 is shown on indicator 54. The amount shown on indicator 54 plus the thickness of contact blade 40 is the width of the recess.

The holder 17 is then slid against the stop 72 with the end 73 of the workpiece 67 being in contact with the anvil 61 of the gauge 53. The reading on the dial 58 directly indicates the deviation of the dimension "X" from the predetermined distance between setting blocks 26 and 28. As particularly shown in FIG. 2 the anvil 61 is provided with a relief groove which avoids gauging against a cut-off tip commonly found in screw machine parts.

The setting blocks 26, 27, 28 and 29 may be set without the use of calipers in the following manner. With contact blade 40 in position "A" of FIG. 7 and gauge 54 at zero setting with anvil 57 in contact with surface 71, the holder 17 is moved against anvil 57 until dial indicator 54 reads an amount equal to dimension "Y." Bridge assembly 34 is moved along with holder 17 and contact blade 40 maintains a position against attachment 66 such as shown in position "A." Setting block 27 is secured to bridge 34 by means of locking pin 36 and setting block 27 is locked to base 11.

This feature makes the gauging device a self-contained unit needing no other instruments for setting up.

The gauge 50 can be employed to measure the depth of the shoulder 69. The contact blade 40 is raised and the workholder adjusted so that the larger diameter surface indicated at 74 in FIG. 7 is directly under the bridge assembly 34. The plunger of lever 42 is then depressed until the bottom edge of the contact blade 40 rests on the surface 74. The stop 43 is lowered to contact plunger 38 and locked with screw 46. The arm 47 is unlocked from the rack 44 and the gauge 50 is moved downwardly to bring its anvil 51 in contact with the top of plunger 38. The indicator 48 is set so that it reads an amount equal to one-half the distance between the large and small diameters of the piece. The gauge 50 is then locked in position. The plunger stop 43 is unlocked and the plunger lever 42 raised so that blade 40 will clear the surface 74. The plunger stop 43 is again locked to the rack 44 in this position to restrict plunger travel to prevent damage to the dial indicator 48 when the plunger lever 42 is released. The position of holder 17 is then adjusted so that the smaller diameter portion 76 is under the blade 40 and the plunger lever 42 again depressed to bring blade into contact with the narrow diameter portion 76. The difference between the reading on the indicator 48 and zero will then indicate the deviation of the depth of the shoulder 69 from the desired dimension.

From the above description it can be seen that by the use of appropriate number of setting blocks a number of dimensions along the length of a workpiece can be accurately gauged, and that after the device has been set up the readings can be made rapidly and easily.

A particular advantage of the gauging device of this invention is its adaptability to use with a wide variety of parts and for the gauging of different kinds of dimensions, for example, the location of holes, shoulders, and flats. FIG. 8, for example, illustrates the use of a ball contact means 75 of the type shown in FIG. 4 which may be used in a manner similar to the blade contact means 39. The casting or stamping 77 shown in FIG. 8 is clamped onto the top of workholder 17 by means of plate 78 which is held to the front surface 24 of the holder 17 by bolt 79. The plate 78 clamps the pin 81 against the workholder 17 and holds it in place. The distance between the pin 81 and the hole 82 is measured by the ball contact member 75 which is held in the bridge assembly 34 the same way as the plate contact member 39. The set up procedure for the device is the same as that previously described except the ball contacts is lowered to seat into hole 81a in the top of pin 81 before gauge 58 is moved into zero position. In gauging, the workholder 17 is adjusted until the ball 80 registers in the hole 82 which seating prevents further sliding movement of the holder.

FIG. 9 illustrates the use of a checking plate attachment 83 in conjunction with the workholder 17 for gauging the length of shoulder rivets and the like. The checking plate 83 is provided with a number of holes with various diameters through which the rivets are passed according to their size and the checking plate is held against the front surface of the holder 17 by a bolt 84. The overall length of the shank of the rivet is gauged by means of the anvil 61 of gauge 53 and the location of shoulders or the like thereon may be checked in the same manner as location of shoulders on other screw machine parts as described in connection with FIG. 7.

FIG. 10 illustrates a clamp 86 useful in the mounting of screw machine parts to be gauged on the workholder 17. The clamp 86 is provided with a slotted opening 87 through which a suitable bolt 88 extends and cooperates with surrounding spring 90 to hold the clamp to the top of the workholder. The arm 89 of the clamp is provided with a V-groove 91 aligned with the V-groove 23 of the workholder and cooperating with it to clamp a generally cylindrical screw machine part to the workholder. The same arm 89 however, may be used equally well to hold a flat part, such as the one illustrated in FIG. 8, to the workholder. Clamp 86 is also provided with a handle 92. Replacement of successive parts to be measured on the workholder 17 can be done easily by pressing downward on handle 92 which in turn raises the arm 89 against spring 90 and sliding the parts being engaged from between the arms 89 and the V-groove 23.

FIG. 11 illustrates clamping apparatus of a somewhat more elaborate type useful in connection with cylindrical screw machine parts having several different diameters and which cannot be adequately held simply by positioning it in one of the V-grooves. In gauging of articles such as the part 93 one extremity is placed in the groove 23 of the holder 17 while the other end is placed in a similar groove of a support plate 94 which is spaced from the front end of the workholder 17 and held to it by shafts 96 and 97. The arm 89 of the clamp 86 applies downward pressure to the central part of the screw machine part held between the plate 94 and the workholder 17 and urges the part against both of these members. Plate 94 may be used as a reference point from which dimensions of the screw machine part 93 are gauged.

FIG. 12 illustrates the attachment of a cylindrical screw machine part to the workholder 17 of the gauging device in a manner enabling the location of a hole in the cylindrical part to be gauged. The workpiece 98 is positioned in the groove 23 of the workholder 17 and, although not shown in FIG. 12, a clamp such as 86 may be provided also to hold it in position. The workpiece 98 has a shoulder 99 which is held against the front end of the workholder by means of the clamping plate 101 which is secured to the workholder by bolt 102. The location of the hole 103 in the body of the workpiece 98 is gauged by the use of the ball contact 75 moving holder 17 until ball 80 seats in the hole. The position of the hole can be located with respect to shoulder 99 by using the front end of the workholder 17 as a reference point or from the end 105 by using the vertical clamping plate 101 as a reference point. A distance equal to one-half the diameter of ball 80 is added to the distance between the setting block in determining location of the hole with respect to a part of workpiece 98.

It will be seen that the gauging device of the invention has the advantage of being adapted to be used in connection with a wide variety of attachments for the gauging of workpieces of various sizes and shapes. Thus, a single device can be used for gauging a wide variety of dimensions on parts of different shapes by the use of few relatively simple attachments.

In addition to being adapted to a wide variety of uses the gauging device of the invention is simple to set up for any particular gauging run and is to be operated with deviations from desired dimensions being read in most cases directly on a single gauge. This facilitates the gauging operation and makes it possible for the operator to gauge a greater number of parts in a given time. Because of the provision of a movable setting block, it is possible to set up the device for the gauging of any desired number of dimensions such as the location of shoulders, holes, flats along a workpiece and to employ the same apparatus engaging other parts of different character and dimensions by a simple resetting operation and the use of appropriate attachments.

I claim:

1. A gauging device including in combination, a base member, a holding block having front and back ends and longitudinally slidable along said base member, means secured to said block for attaching an article to be gauged to said block, a plurality of setting means longitudinally slidable along said base member adjacent said block and affixable to said base member, support means longitudinally slidable along said base member, means for connecting said support means successively to said setting means, contact means carried on said support means and adapted to be moved adjacent said block for registry with portions of articles attached thereto and a gauge longitudinally slidable along said base member and adapted to be held against the back end of said block so that longitudinal movement of said block is measured by said gauge as said block is slid along said base member in moving portions of articles attached thereto into registry with said contact means as said support means is successively connected to said setting means.

2. A gauging device including in combination, a base member, a holding block having front and back ends and longitudinally slidable along said base member, means held on the front end of said block for attaching an article to be gauged to said block, a plurality of setting means longitudinally slidable along said base member adjacent said block and affixable to said base member, support means longitudinally slidable along said base member, means for connecting said support means successively to said setting means, contact means carried on said support means and adapted to be moved adjacent said block for registry with portions of articles attached thereto, a first gauge longitudinally slidable along said base member and adapted to be held against the back end of said block, so the longitudinal movement of said block is measured by said gauge as said block is slid along said base member in moving portions of articles attached thereto into registry with said contact means as said support means is successively connected to said setting means and a second gauge longitudinally slidable along said base member and adapted to be affixed thereto in position to be actuated by one end of an article held on said block so that said second gauge indicated the deviation from a predetermined dimension of the longitudinal distance of the end of the article from the front end of said block.

3. A gauging device including in combination, a base member, a holding block having front and back ends and horizontally slidable along said base member, means held on the front end of said block for attaching an article to be gauged to said block, a plurality of setting means horizontally slidable along said base member adjacent said block and affixable to said base member, support means horizontally slidable along said base, means for connecting said support means successively to said setting means, contact means carried on said support means and adapted to be moved vertically toward said block for registry with portions of articles attached thereto, a first gauge horizontally slidable along said base member and adapted to be held against the back end of said block so that horizontal movement of said block is measured by said gauge as said block is slid along said base member to move portions of articles attached thereto into registry with said contact means as said support means is successively connected to said setting means, a second gauge horizontally slidable along said base member and adapted to be affixed thereto in position to be actuated by one end of an article held on said block and a third gauge carried on said support means and actuated by vertical movement of said contact means.

4. A gauging device including in combination, a base member, a holding block having vertically extending front and back surfaces and horizontally slidable along said base member, a vertical plate attached to said front surface of said block and adapted to facilitate attachment of an article to be measured to said block, a plurality of setting blocks horizontally slidable along said base member and affixable to said base member, a bridge assembly spanning said holding block and horizontally slidable along said base member, means for connecting said bridge assembly to each of said setting blocks, a contact blade having a substantially flat vertical surface adapted to engage said vertical plate carried on said bridge assembly and a gauge adapted to be held against the back surface of said block so that horizontal movement of said holding block is measured by said gauge as said holding block is slid along said base member in moving portions of articles attached thereto into registry with the flat surface of said contact means as said bridge assembly is successively connected to said setting blocks.

5. A gauging device adapted for gauging dimensions of screw machine parts said device including in combination, a base member having a first pair of longitudinally extending tracks, a block-shaped holder having vertically extending front and back surfaces and a horizontal top surface and horizontally slidable between said tracks, clamping means attached to said holder for securing a screw machine part to be gauged on said top surface against movement relative to said holder, a vertical plate attached to said front surface of said holder and adapted to facilitate positioning of a part to be gauged on said holder, a plurality of setting blocks slidable along said base member parallel to said tracks and affixable to said base member, a second pair of horizontally extending tracks parallel to said first pair, a bridge assembly spanning said holder and slidable between said second pair of tracks, means for connecting said bridge respectively to each of said setting blocks thereby to locate said bridge in any desired position along said tracks, vertically movable contact means carried on said bridge assembly, means for positioning said contact means above said top surface of said holder and in position for registry with a shoulder of a screw machine part secured thereto, and a gauge adapted to be held against the back surface of said holder so that horizontal movement of said holder is measured as said holder is slid between said first pair of tracks to move a shoulder on a screw machine part secured thereto into registry with said contact means positioned at a predetermined location along said tracks.

References Cited in the file of this patent

UNITED STATES PATENTS

| | | |
|---|---|---|
| 1,394,324 | Matthews | Oct. 18, 1921 |
| 2,539,373 | North | Jan. 23, 1951 |
| 2,815,580 | Dinger | Dec. 10, 1957 |
| 2,820,300 | Gadomski | Jan. 21, 1958 |